United States Patent
Rivetti et al.

(10) Patent No.: US 6,271,328 B1
(45) Date of Patent: Aug. 7, 2001

(54) LIQUID, POLYMERIZABLE COMPOSITION YIELDING OPTICAL ARTICLES SHOWING A HIGH REFRACTIVE INDEX

(76) Inventors: Franco Rivetti, Via Capitano G. Sella, 41-Schio, Vicenza; Fiorenzo Renzi, Via Dante, 1-Gorgonzola, Milan; Ugo Romano, Via Fermi, 12-Vimercate, Milan, all of (IT)

(*) Notice: Subject to any disclaimer, the term of this patent is extended or adjusted under 35 U.S.C. 154(b) by 0 days.

(21) Appl. No.: 07/315,728

(22) Filed: Feb. 24, 1989

(30) Foreign Application Priority Data

Mar. 4, 1988 (IT) .................................................... 19645/88

(51) Int. Cl.[7] .................................................. C08F 112/14
(52) U.S. Cl. ............................................ 526/313; 526/314
(58) Field of Search ...................................... 526/313, 314

(56) References Cited

U.S. PATENT DOCUMENTS 4,829,136 * 5/1989 Oates ..................................... 526/314

* cited by examiner

*Primary Examiner*—Bernard Lipman

(57) ABSTRACT

A liquid composition, polymerizable by means of a free-radical route to yield optical articles endowed with a high refractive index, contains an allyl-carbonate derivative definable with the general formula:

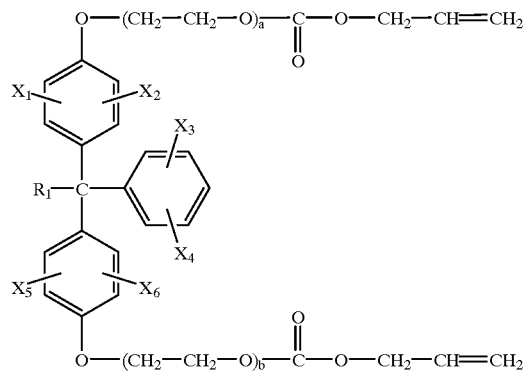

(wherein $R_1$, $X_1$, $X_2$, $X_3$, $X_4$, $X_5$, $X_6$, a and b are as defined in the disclosure) and a copolymerizable monomer containing at least one ethylenic unsaturation in its molecule.

20 Claims, No Drawings

LIQUID, POLYMERIZABLE COMPOSITION YIELDING OPTICAL ARTICLES SHOWING A HIGH REFRACTIVE INDEX

The present invention relates to a liquid polymerisable composition, which by polymerisation yields optical articles endowed with a high refractive index. The invention relates also to the optical articles obtained from such a composition.

In the field of organic glasses, the products are interesting, which derive from the polymerization of bis (allyl carbonates) of diols, in particular diethylene glycol bis(allyl carbonate), and this on considering their optical and mechanical characteristics, which render then useful for the preparation of optical articles (F. Strain; "Encylcopaedia of Chemical Processing and Design", volume I, Interscience Publishers, New York, 1964, pages 799-foll.)

However, in the preparation of the optical articles from such polymerisates, thicknesses are required, which are relatively higher than of articles made from inorganic glass, owing to the relatively low values of refractive index which are typical for the same polymerisates. This is disadvantageous both from the viewpoint of the weight of the articles, and as regards their aesthetical features, besides the difficulties to be coped with, when high-thickness articles endowed with a high optical quality have to be manufactured.

Therefore, in order to overcome this problem, compositions were developed in the art, which are suitable for forming polymerisates endowed with a relatively high value of refractive index. Within the range of the allyl-carbonate derivatives, these compositions according to the prior art generally comprise polymerisable monomers which contain an aromatic moiety, such as bisphenol-A bis(allyl carbonate) and the relevant ethoxylated derivatives thereof, such as disclosed, e.g., in U.S. Pat. No. 4,622,376; in German patent application No. 3,439,395, and in the U.S. patent application Ser. No. 168,162 filed on Mar. 15, 1988 now abandoned.

The present Applicant has found now a liquid, polymerisable composition, containing a particular allyl-carbonate derivative, which makes it possible for optical articles to be obtained, which are endowed with good general characteristics, and display a refractive index which is further improved as compared to those obtainable with the compositions according to the prior art.

In accordance therewith the present invention relates to a liquid composition, polymerisable by means of a free-radical route to yield optical articles endowed with a high refractive index, which contains A) from 20 to 80% by weight of an allyl-carbonate derivative, which can be represented by means of the formula:

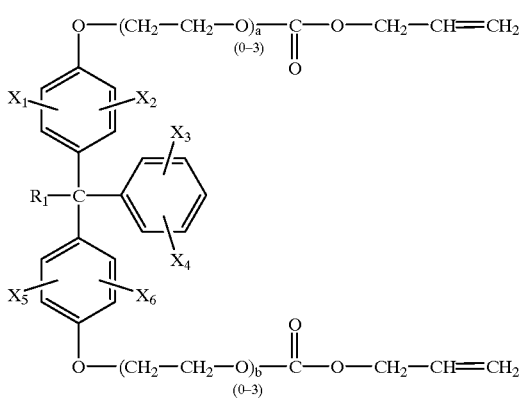

(I)

wherein:
$R_1$ represents the hydrogen atom, or a linear or branched ($C_1$–$C_6$)-alkyl radical, a phenyl radical or a benzyl radical;

$X_1$, $X_2$, $X_3$, $X_4$, $X_5$, $X_6$ represent, independently from one another, the hydrogen atom, or a halogen atom selected from among chlorine and bromine; and a and b represent, independently from each other, an integer comprised within the range of from 0 to 3;

B) from 80 to 20% by weight of a copolymerisable monomer containing at least one ethylenic unsaturation in its molecule.

The (A) component of the composition according to the present invention can be obtained by means of the reaction of the di-hydroxy precursor and allyl chloroformate in the presence of an acid acceptor.

According to an alternative route, said di-hydroxy precursor can be reacted with phosgene in order to form the corresponding bis(chloroformate), with this latter being then reacted with allyl alcohol in order to obtain the (A) component.

These reactions are per se known in the art.

The preparation of the (A) component, in which a and b are different from zero, can be carried out by means of a trans-esterification between the di-hydroxy precursor and diallyl-carbonate, in the presence of a basic catalyst. Also this trans-esterification reaction is per se known in the art; reference is made, e.g., to the disclosure of European patent No. 35,304. When the reaction is carried out under trans-esterification conditions, the (A) component is obtained in the form of a mixture of monomer and oligomers, the ratio of which may vary as a function of the ratio of the di-allyl-carbonate reactant to the di-hydroxy precursor. From these mixtures, the monomeric (A) component can be separated, or the same mixture can be used as the (A) component. In this latter case, the content of oligomers in the mixture should not preferably exceed the value of 30% by weight.

A preferred (A) component for the composition according to the present invention is 1-phenyl-ethylidene-bis(4,4'-hydroxy-ethoxy-benzene) bis(allyl carbonate), i.e., the compound corresponding to the formula (I) in which:

$R_1$=methyl;
$X_1$=$X_2$=$X_3$=$X_4$=$X_5$=$X_6$=H; and
a=b=1:

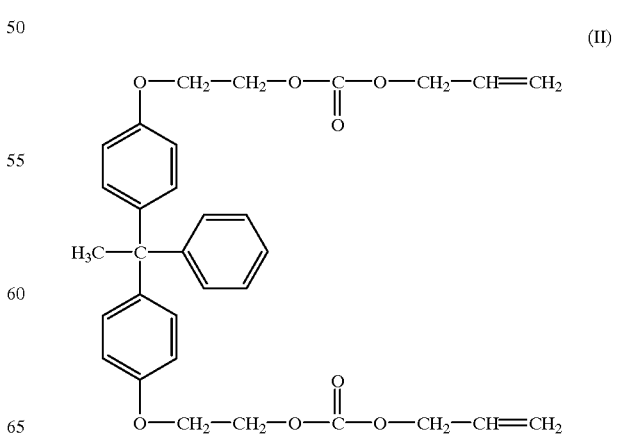

(II)

This preferred (A) component can be obtained by means of the trans-esterification of diallyl carbonate and 1-phenyl-ethylidene-bis(4,4'-hydroxy-ethoxy-benzene):

(III)

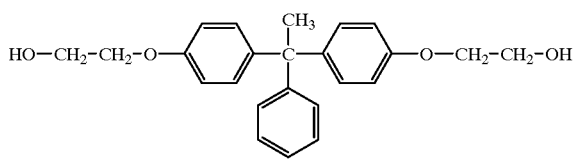

by operating in the presence of a basic catalyst, and with a molar ratio between the two reactants higher than about 6/1.

Under these conditions, a mixture of compound (II) with its oligomers, definable by means of the formula:

(IV)

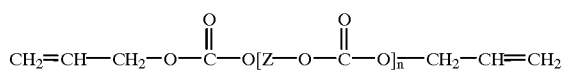

wherein:

Z is the radical of the dihydroxy precursor (III); and n is comprised within the range of from 1 to about 5, is obtained.

In the preferred form of practical embodiment of the present invention, the reaction is carried out with a molar ratio of the diallyl-carbonate to the compound (III) which is of the order of 10/1–12/1, and as the reaction product, a mixture of monomer (n=1 in the above formula (IV)) and oligomers (n=1 in said formula (IV)) and oligomers (n>1 in said formula (IV)), is obtained, which contains 80–90% by weight of monomer. Such a mixture can be directly used as the (A) component of the composition according to the present invention.

The (B) component of the composition according to the present invention is preferably selected from the group consisting of diallyl ortho-phthalate, diallyl isophthalate, diallyl terephthalate, triallyl cyanurate, triallyl isocyanurate, phenyl acrylate, phenyl methacrylate, benzyl acrylate, benzyl methacrylate, phenoxyethyl acrylate, phenoxyethyl methacrylate, vinyl benzoate, m-chlorovinyl benzoate, and mixtures thereof.

The (A) component of the composition is essential in order to obtain the desired values of refractive index in the optical articles, whilst the (B) component is essential in order to obtain a liquid composition showing viscosity values which are suitable for the processing and the transformation into organic glasses.

In the preferred form of practical embodiment, the composition according too the present invention contains from 35 to 65% by weight, of (A) component, and from 65 to 35% by weight of (B) component.

The composition according to the present invention additionally contains a polymerization initiator in an amount comprised within the range of from 2 to 8 parts by weight per each 100 parts by weight of the total of the (A) and (B) components. Such polymerization initiators are soluble in the same composition, and are capable of generating free radicals at a temperature comprised within the range of from about 30° C. to about 100° C. Non-limitative examples of such initiators are di-isopropyl-peroxy-dicarbonate, di-cyclohexyl-peroxy-dicarbonate, di-sec-butyl-peroxy-dicarbonate, di-benzoyl peroxide and tert-butyl-perbenzoate.

In the preferred form of practical embodiment, the polymerization initiator is contained in the composition in an amount comprised within the range of from 3 to 7 parts by weight per each 100 parts by weight of the total of the (A) and (B) components.

The liquid, polymerisable composition according to the present invention may preferably contain one or more conventional additives, such as stabilizers, mould-release agents, dyes, pigments, U.V.- or I.R.-light absorbers and the like, however in a total amount which does not exceed 1 part by weight per each 100 parts by weight of the total of (A) and (B) components.

The liquid, polymerisable composition according to the present invention is transformed into optical articles by means of the process of mould-polymerization (casting). The polymerization is initiated by the free radicals generated by the decomposition of the polymerization initiators added to the same composition, by generally operating at temperatures comprised within the range of from 35° to 100° C. Under these conditions, the necessary times in order to achieve a complete polymerization are comprised within the range of from 2 to 100 hours.

The so-obtained articles show a high refractive index, a low light dispersion and good values of colour and of mechanical characteristics, as will be evident from the following experimental examples, which are reported for the purpose of merely exemplifying the present invention, without limiting it.

In said examples, the liquid compositions are prepared, the polymerization initiator di-cylohexyl-peroxy-dicarbonate (DCPD) is added, and the resulting compositions are polymerized inside glass moulds assembled with a flexible gasket of plasticized poly(vinyl chloride), which determines the thickness of the polymeric article. In particular, flat sheets are prepared, the thickness of which is comprised within the range of from 1.4 mm to 3.0 mm, and neutral lenses are prepared, the thickness of which is of 2.0 mm.

The polymerization takes place inside a forced-air-circulation oven, at the temperature of 48° C. for 72 hours in case of the flat sheets, whilst the neutral lenses are polymerized inside a water bath with a polymerization cycle of 20 hours of duration, at temperatures comprised within the range of from 40 to 80° C.

On the hardened samples, the following characteristics are determined:

the refractive index ($n_D^{20}$) and the dispersion factor, as measured by means of the Abbe refractometer (ASTM D-542);

haze % and transmittance within the visible range, as measured by means of the Hazegard XL-211 by Gardner (ASTM D-1003);

the yellow index (Y.I.), defined as:

$$Y.I.=100/Y.(1.277x-1.06Z),$$

as meured by means of the XL-805 colorimeter by Gardner (ASTM D-1925);

the density, as determined by means of the hydrostatic balance at the temperature of 25° C. (ASTM D-792);

the Rockwell (M) hardness, as measured by means of the Rockwell durometer (ASTM D-785);

the tensile strength and the elastic modulus at bending, as measured by means of the INSTRON dynamometer (ASTM D-790);

the Izod impact strength without notch (ASTM D-256, modified);

the heat distorsion temperature (HDT) (ASTM D-648).

EXAMPLE 1

Preparation of 1-phenyl-ethylidene-bis-(4,4'-hydroxy-ethoxy-benzene) bis(allyl-carbonate)

To a three-necked flask with jacket, equipped with a thermometer and a magnetic stirrer, surmounted by a distillation column with 20 perforated trays, 378 g (1.0 mol) of 1-phenyl-ethylidene-bis(4,4'-hydroxy-ethoxy-benzene), 1,704 g (12.0 mol) of diallyl-carbonate and 0.60 ml of a solution at 30% by weight of sodium methoxide in methanol are charged. The reaction is allowed to proceed for 1.5 hours, at a temperature of 120° C. and under a pressure of 150 torr, with the allyl alcohol formed during the reaction being distilled off 115 g of allyl alcohol more than 99% pure is collected.

The reaction mixture is then cooled and washed twice with 1,000 ml of distilled water in order to remove the alkalinity. The excess of diallyl carbonate is then distilled under reduced pressure (temperature up to 120° C., pressure 1 torr), and the residue from the distillation, in the form of a viscous oil, is decolorized with 2% by weight of activated charcoal, by operating at 120° C. for 4 hours, and is then filtered off.

527 g of the compound of the title is obtained, which has the following characteristics:

| | |
|---|---|
| viscosity at 25° C. | 94.0 Pa.s |
| viscosity at 75° C. | 0.34 Pa.s |
| refractive index $n_D^{20}$ | 1.5653 |
| colour (APHA) | 40–50 |
| HPLC analysis: | | column: Lichrosorb silica Si 60.5 μm; mobile phase hexane/ethyl ether 80/20; flow rate 1.5 ml/minute; U.V. detector at 254 nm.

| | | |
|---|---|---|
| surface area %: | monomer | 81.3 |
| | dimer | 17.1 |
| | trimer | 1.6 |

EXAMPLES 2–5

In these examples, as the (A) component: 1-phenyl-ethylidene-bis(4,4'-hydroxy-ethoxy-benzene) bis(allyl carbonate (mixture of the monomer and of oligomers), prepared in Example 1, is used. As the (B) component, either diallyl-terephthalate (DAT) or diallyl-isophthalate (DAIP) is used. The polymerization initiator is dicyclohexyl-peroxydicarbonate (DCPD), used in the amount of 5% in the mixture.

The liquid compositions are prepared, which are reported in Table 1, together with their values of viscosity and of refractive index.

TABLE 1

| | Components (% by weight) | | | | | |
|---|---|---|---|---|---|---|
| Example N. | A | DAT | DAIP | DCPD | Viscosity at 25° C., cst | Refractive index ($n_D^{20}$) |
| 2 | 55 | 40 | — | 5 | 354 | 1.5494 |
| 3 | 50 | 45 | — | 5 | 235 | 1.5489 |
| 4 | 55 | — | 40 | 5 | 437 | 1.5475 |
| 5 | 45 | — | 50 | 5 | 187 | 1.5467 |

The compositions of the Examples from 2 to 5 are polymerized as flat sheets, of 1.4 mm of thickness, by operating according to the modalities as reported in the disclosure, and on such articles the characteristics are determined, which are reported in Table 2.

TABLE 2

| Example No. | 2 | 3 | 4 | 5 |
|---|---|---|---|---|
| Density (25° C.; g/cc) | 1.2428 | 1.2454 | 1.2468 | 1.2502 |
| Refractive index ($n_D^{20}$) | 1.5774 | 1.5764 | 1.5765 | 1.5757 |
| Dispersion factor | 31.5 | 31.5 | 32.3 | 32.3 |
| Yellow index (Y.I.) | 1.35 | 1.63 | 2.16 | 2.20 |
| Haze (%) | 0.26 | 0.18 | 0.25 | 0.23 |
| Transmittance within the visible range (%) | 91.3 | 91.4 | 91.0 | 90.5 |
| Rockwell (M) hardness | 87 | 92 | 94 | 95 |

EXAMPLES 6–7

Liquid compositions are prepared with the (A) component of Example 1, and using, as the (B) component: either m-chloro-vinyl benzoate (MCVB), or a mixture of this latter with diallyl isophthalate (DAIP), as reported in Table 3.

TABLE 3

| | Components (% by weight) | | | | | |
|---|---|---|---|---|---|---|
| Example N. | A | MCVB | DAIP | DCPD | Viscosity at 25° C., cst | Refractive Index ($n_D^{20}$) |
| 6 | 55 | 40 | — | 5 | 142 | 1.5562 |
| 7 | 35 | 40 | 20 | 5 | 82 | — |

The so-obtained compositions are polymerized as flat sheets of 1.4 mm of thickness, and the characteristics of the so obtained articles are reported in Table 4.

TABLE 4

| Example No. | 6 | 7 |
|---|---|---|
| Density (25° C.; g/cc) | 1.2838 | 1.2877 |
| Refractive index ($n_D^{20}$) | 1.5814 | 1.5785 |
| Dispersion factor | 32.1 | 33.6 |
| Yellow index (Y.I.) | 2.98 | 3.39 |
| Haze (%) | 0.29 | 0.18 |
| Transmittance, within the visible range | 90.9 | 91.3 |
| Rockwell (M) hardness | 85 | 97 |

EXAMPLES 8–10

Liquid compositions are prepared with the (A) component of Example 1, and using, as the (B) component: mixtures of diallyl isophthalate (DAIP) and phenoxy-ethyl acrylate (PHA), in various weight ratios as reported in table 5.

TABLE 5

| Example N. | Components (% by weight) | | | | Viscosity at 25° C., cst | Refractive index ($n_D^{20}$) |
|---|---|---|---|---|---|---|
| | A | DAIP | PHA | DCPD | | |
| 8 | 45 | 40 | 10 | 5 | — | — |
| 9 | 50 | 35 | 10 | 5 | — | — |
| 10 | 45 | 35 | 15 | 5 | 153 | 1.5425 |

The so-obtained compositions are polymerized as flat sheets of 1.4 mm of thickness, and the characteristics of these articles are reported in Table 6.

TABLE 6

| Example No. | 8 | 9 | 10 |
|---|---|---|---|
| Density (25° C.; g/cc) | 1.2411 | 1.2457 | 1.2452 |
| Refractive index ($n_D^{20}$) | 1.5746 | 1.5747 | 1.5746 |
| Dispersion factor | 33.2 | 33.2 | 33.2 |
| Yellow index (Y.I.) | 1.80 | 1.72 | 1.32 |
| Haze (%) | 0.23 | 0.22 | 0.18 |
| Transmittance within the visible range (%) | 91.4 | 91.4 | 91.5 |
| Rockwell (M) hardness | 93 | 91 | 87 |

EXAMPLE 11

The liquid composition of Example 10 is polymerized in the form of neutral lenses of 2 mm of thickness, by operating under the same conditions as reported in the disclosure.

The characteristics, of the so-obtained lenses are reported in Table 7.

TABLE 7

| Density (25° C.; g/cc) | 1.2450 |
|---|---|
| Yellow index (Y.I.) | 1.50 |
| Haze (%) | 0.21 |
| Transmittance within the visible range (%) | 91.3 |
| Rockwell (M) hardness | 98 |

EXAMPLE 12

The liquid composition of Example 10 is polymerized in the form of flat sheets of 3 mm of thickness, by operating under the same conditions as reported in the disclosure. The characteristics of so-obtained polymerized articles are reported in Table 8.

TABLE 8

| Density (25° C.; g/cc) | 1.247 |
|---|---|
| Shrinkage (%) | 7.6 |
| Refractive index ($n_D^{20}$) | 1.5750 |
| Yellow index (Y.I.) | 1.99 |
| Haze (%) | 0.28 |
| Transmittance within the visible range (%) | 90.9 |
| Rockwell (M) hardness | 105 |
| Modulus at bending (MPa) | 3300 |
| Tensile strength at bending (MPa) | 116 |

TABLE 8-continued

| IZOD impact strength without notch, KJ/m² | 9.6 |
|---|---|
| HDT (° C.) | 50.5 |

What is claimed is:

1. Liquid compositions, polymerizable by a free-radical route to yield optical articles possessing a high refractive index, comprising:

(a) from 20 to 80 percent by weight of an allyl-carbonate derivative represented by the formula

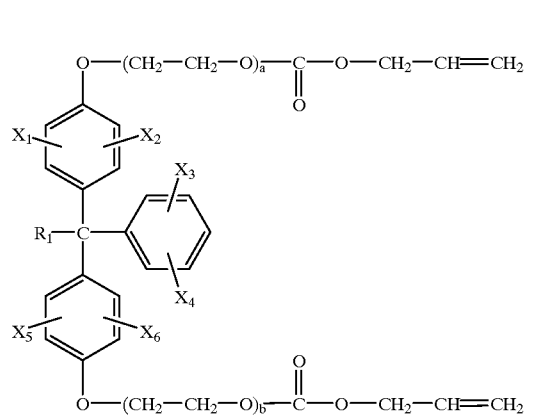

(I)

wherein:
  $R_1$ is selected from the group consisting of a hydrogen atom, a linear ($C_1$–$C_6$)-alkyl radical, a branched ($C_1$–$C_6$)-alkyl radical, a phenyl radical and a benzyl radical;
  $X_1$, $X_2$, $X_3$, $X_4$, $X_5$, and $X_6$ are independent from each other, and are selected from the group consisting of a hydrogen atom, a chlorine atom and a bromine atom; and
  a and b are independent of each other, and are integers of from 0 to 3;

(b) from 80 to 20 percent by weight of a copolymerizable monomer having at least one ethylenic unsaturation in its molecule.

2. Compositions as defined in claim 1, wherein:
  $R_1$ is methyl;
  $X_1$, $X_2$, $X_3$, $X_4$, $X_5$, and $X_6$ are hydrogen atoms; and
  a and b are 1.

3. Compositions as defined in claim 1, wherein component (a) comprises a mixture of a monomer and its oligomers, and wherein said oligomers comprise not more than 30 percent by weight of the mixture.

4. Compositions as defined in claim 2, wherein component (a) comprises a mixture of a monomer and its oligomers, and wherein said oligomers comprise not more than 30 percent by weight of the mixture.

5. Compositions as defined in claim 1, wherein component (b) is selected from the group consisting of diallyl ortho-phthalate, diallyl isophthalate, diallyl terephthalate, triallyl cyanurate, triallyl isocyanurate, phenyl acrylate, phenyl methacrylate, benzyl acrylate, benzyl methacrylate, phenoxyethyl acrylate, phenoxyethyl methacrylate, vinyl benzoate, m-chlorovinyl benzoate, and mixtures of the foregoing.

6. Compositions as defined in claim 1, comprising from 35 to 65 percent by weight of component (a), and from 65 to 35 percent by weight of component (b).

7. Compositions as defined in claim 1, further comprising a free radical polymerization initiator.

8. Compositions as defined in claim 7, wherein said free-radical polymerization initiator is in an amount of from 2 to 8 parts by weight per 100 parts by weight of component (a) and component (b) combined.

9. Compositions as defined in claim 8, wherein said initiator is in an amount of from 3 to 7 parts by weight per 100 parts by weight of component (a) and component (b) combined.

10. Compositions as defined in claim 1, further comprising conventional additives in an amount not more than 1 part by weight per 100 parts by weight of component (a) and component (b) combined, wherein said additives are selected from the group consisting of stabilizers, mold-release agents, dyes, pigments, U.V. light absorbers, I.R. light absorbers, and combinations of the foregoing.

11. Optical articles possessing a high refractive index, produced by free-radical polymerization of the compositions defined in claim 1.

12. Optical articles possessing a high refractive index, produced by free-radical polymerization of the compositions defined in claim 2.

13. Optical articles possessing a high refractive index, produced by free radical polymerization of the compositions defined in claim 3.

14. Optical articles possessing a high refractive index, produced by free radical polymerization of the compositions defined in claim 4.

15. Optical articles possessing a high refractive index, produced by free radical polymerization of the compositions defined in claim 5.

16. Optical articles possessing a high refractive index, produced by free radical polymerization of the compositions defined in claim 6.

17. Optical articles possessing a high refractive index, produced by free radical polymerization of the compositions defined in claim 7.

18. Optical articles possessing a high refractive index, produced by free radical polymerization of the compositions defined in claim 8.

19. Optical articles possessing a high refractive index, produced by free radical polymerization of the compositions defined in claim 9.

20. Optical articles possessing a high refractive index, produced by free radical polymerization of the compositions defined in claim 10.

* * * * *